United States Patent Office 2,839,484
Patented June 17, 1958

2,839,484

PROCESS FOR THE PRODUCTION OF STABLE AQUEOUS SOLUTIONS OF HARDENABLE CONDENSATION PRODUCTS OF MELAMINE, THIOUREA, AND FORMALDEHYDE AND PRODUCT OBTAINED

Alfred Renner, Basel, Switzerland, assignor to Ciba Limited, Basel, Switzerland, a Swiss firm No Drawing. Application August 27, 1956
Serial No. 606,223

Claims priority, application Switzerland
September 7, 1955

12 Claims. (Cl. 260—29.4)

It is known that hardenable mixed resins can be made from melamine, thiourea and formaldehyde. It is also known to stabilize colloidal aqueous acid solutions having a high content of melamine-formaldehyde resin by incorporating thiourea therewith in a proportion which is greater than that required for binding the formaldehyde still present.

This invention provides a process for producing stable solutions of hardenable condensation products of melamine, thiourea and formaldehyde by heating the components in an aqueous alkaline medium. In the process of this invention melamine and thiourea are heated in a molecular ratio within the range of 1:0.05 to 1:0.5 with formaldehyde in an aqueous alkaline medium at a pH value within the range of 7.0 to 10.0 at a temperature not substantially exceeding 100° C. until a test portion of the resin solution, when diluted with water at 20° C. to a solids content of 30–40 percent, produces slight turbidity, and then the resin solution is cooled to room temperature and adjusted to a pH value within the range of 8.5 to 10.0.

An advantageous procedure is to heat melamine and thiourea in a molecular ratio of about 1:0.1 with formaldehyde in an aqueous alkaline medium at a pH value of about 9.4 at 60–100° C. until a test portion of the resin solution, when diluted with water at 20° C. to a solids content of 35 percent, produces slight turbidity, and then, after cooling the resin solution, adjusting its pH value to about 9.4.

Advantageously, the solids content of the finished resin solution is within the range of 40–65 percent. If the solids content of the mixture is lower than that which the finished resin solution should have, it can be concentrated to the desired solids content by distillation under reduced pressure. The distillation is advantageously carried out before the termination of the condensation.

It may be of advantage to carry out the heating operation, at least towards the end, in the presence of an aliphatic alcohol miscible with water, such as methanol, ethanol, glycerine or hexane-triol. The formaldehyde is advantageously used in a proportion such that for each —$NH_2$ group in the melamine-thiourea mixture there is present between 0.5 and 1.0 molecular proportion, and advantageously about 0.7 molecular proportion of formaldehyde.

The resin solutions so obtained are stable at room temperature for several months without losing their capacity for being subsequently worked up. No crystallization or solidification occurs even when the solution is stored at 0° C. The resin solutions are especially suitable for impregnating paper or textile materials and for the production of laminated products. They can also be successfully used for glueing wood. Webs of paper or fabric that have been impregnated with a resin solution produced in accordance with the invention are not brittle after being dried, unlike webs which have been impregnated with an unmodified melamine-formaldehyde resin. The condensation products produced in accordance with the invention harden under the action of heat more rapidly than condensation products which have been prepared without the addition of thiourea. Accordingly, for most purposes the addition of an accelerator for hardening can be dispensed with. In the hardened state the condensation products possess good strength and a high resistance to boiling and cold water, acids, alkalies and dyestuff solutions, and also have a good resistance to heat and a surprisingly high fastness to light. They also have an excellent appearance and gloss when during shaping or hardening, as for example in the production of laminated products, smooth surfaces are to be produced.

The following examples illustrate the invention, the parts and parts percent or per mil being by weight unless otherwise stated and the relationship of parts by weight to parts by volume being the same as that of the kilogram to the litre:

*Example 1*

1000 parts of an aqueous solution of formaldehyde of 30 percent strength (10 mols) and 650 parts of water are heated to 60° C. in an apparatus provided with stirring means, a reflux condenser and a thermometer, and the solution is adjusted to a pH value of 8.0 by means of an aqueous solution of sodium hydroxide. In the resulting solution there are dissolved 567 parts of melamine (4.5 mols) and 38 parts of thiourea (0.5 mol) at 80° C. After the addition of charcoal, the solution is filtered and its pH value is adjusted to 9.4 by means of an aqueous solution of sodium hydroxide, and then the solution is heated to 80° C. After continuing the condensation for one hour at 80° C., the resin solution is concentrated by vacuum distillation to a resin content of 50 percent, and, after the addition of 16.5 grams of hexanetriol, the mixture is boiled at a pH value of 9.4, while stirring and refluxing, until a test portion of the resin solution produces a slight turbidity when diluted with one half its volume of water at 20° C. The whole is then cooled to room temperature and the pH value of the resin solution is adjusted to 9.4.

The resin solution so obtained has a viscosity of 40–50 centipoises. After being stored for 2 months at 20–25° C., the resin solution is still completely clear and its capacity for being worked up is unimpaired. No crystallization or solidification occurs even when the solution is stored at 0° C.

*Example 2*

Formaldehyde, melamine and thiourea are condensed together in the same proportions and in the same manner as in Example 1, except that after the condensation has been carried on for one hour the mixture is concentrated to a resin content of 60 percent. The resin solution is then further condensed, without the addition of an aliphatic alcohol, at a pH value of 9.4, while stirring and refluxing, until one part of the condensate exhibits a slight turbidity when diluted with 0.7 part by volume of water at 20° C. The whole is then cooled to room temperature and there is added a quantity of ethanol such as to produce a solids content of 50 percent. The pH value is then adjusted to 9.4.

The resin solution so obtained has a viscosity of 30–40 centipoises. After being stored for 3 months at 20–25° C. the solution is still quite clear and its capacity for being worked up is unimpaired. No crystallization or salve-formation occurs even when the solution is stored at 0° C.

*Example 3*

1000 parts of an aqueous solution of formaldehyde of 30 percent strength (10 mols) and 600 parts of water are heated to 60° C., and the pH value of the solution is adjusted to 8.0 by means of an aqueous solution of sodium hydroxide. There are then dissolved in the solution 420 parts of melamine (3⅓ mols) and 127 parts of thiourea (1⅔ mols) at 80° C. and, after the addition of decolorizing charcoal, the whole is filtered and the solution is adjusted to a pH value of 9.4 by means of aqueous sodium hydroxide solution. After the addition of 15 parts of glycerine followed by condensation for one hour at 80° C., the resin solution is concentrated to a resin content of 50 percent by distillation under reduced pressure. The resin solution is then boiled, while stirring and refluxing and maintaining the pH value at 9.4, until a test portion exhibits a slight turbidity when diluted with one half its volume of water at 20° C., and then the whole is cooled to room temperature.

The resin solution so obtained, which has a viscosity of 15–20 centipoises, is stable for two months at 20–25° C. Even when stored at 0° C. it exhibits no crystallization or salve-formation.

*Example 4*

810 parts of an aqueous formaldehyde solution of 37 percent strength (10 mols), 17 parts of hexane-triol and 350 parts of water are mixed together and heated to 60° C. The pH value of the solution is adjusted to 9.4 by means of an aqueous solution of caustic soda. 504 parts of melamine (4 mols) and 76 parts of thiourea (1 mol) are then added, and the pH value of the mixture is adjusted to 9.4, and it is then heated to the boil. When the melamine and thiourea have dissolved, the mixture is heated, while stirring and refluxing, until a test portion exhibits a slight turbidity when diluted with one half its volume of water at 20° C. The mixture is then rapidly cooled to room temperature, its pH value is adjusted to 9.4, and the resin solution is filtered after the addition of a small amount of decolorizing charcoal.

The resin solution has a viscosity of 30–40 centipoises and it is stable at 20–25° C. for about 2 months. When the solution is stored at 0° C. no crystallization or salve-formation occurs.

*Example 5*

1220 parts of an aqueous formaldehyde solution of 37 percent strength (15 mols), 600 parts of ethyl alcohol and 25 parts of hexane-triol are heated at 70° C. in the apparatus described in Example 1, and then the pH value of the solution is adjusted to 7.5 by means of an aqueous solution of sodium hydroxide. In the resulting solution there are dissolved 850 parts of melamine (6.75 mols) and 57 parts of thiourea (0.75 mol). The solution is then heated at 70° C. and a pH value of 7.5 until a test portion of the resin solution exhibits a slight turbidity when diluted with one half its volume of water at 20° C., then the pH value is immediately adjusted to 9.0 to 9.5 and the solution is cooled to room temperature and filtered.

The resin solution so obtained has a resin content of about 50 percent and a viscosity of 30–40 centipoises. It is stable for about one month at 20–25° C. Even when stored at 0° C. the resin syrup remains clear.

*Example 6*

1825 parts of an aqueous formaldehyde solution of 37 percent strength (22.5 mols) and 25 parts of hexane-triol are heated to 60° C. in the apparatus described in Example 1, and then the pH value of the solution is adjusted to 10.0 with an aqueous solution of sodium hydroxide. In the solution so obtained there are dissolved 882 parts of melamine (7 mols) and 38 parts of thiourea (0.5 mol) at 80° C. The solution is then heated at 80° C. and a pH value of 10 until a test portion of the resin solution exhibits a slight turbidity when diluted with 0.75 part of its volume of water. Then 1130 parts of methanol are added and the resin syrup is cooled to room temperature and filtered, if desired after the addition of decolorizing charcoal.

The resin solution so obtained has a resin content of about 40 percent and a viscosity of 25–35 centipoises. After being stored for three months at 20–25° C. the solution is still quite clear. Even when stored at 0° C. the solution remains clear.

What I claim is:

1. A process for the production of stable solutions of hardenable condensation products of melamine, thiourea and formaldehyde, and which solutions have a solids content of 40–65 percent, which comprises heating melamine and thiourea in a molecular radio within the range of 1:0.05 to 1:0.5 with formaldehyde in aqueous alkaline solution at a pH value within the range of 7.0 to 10.0, which solution has a solids content below 40 percent, concentrating said solution by distillation to give a solids content of 40–65 percent, then heating the concentrated solution at a temperature not substantially exceeding 100° C. until a test portion of the resin solution, when diluted with water at 20° C. to a solids content of 30–40 percent, produces slight turbidity, and then cooling the resin solution to room temperature and adjusting to a pH value of 8.5 to 10.0, the formaldehyde in said process being used in a proportion such that 0.5 to 1.0 molecular proportion thereof is present for each —$NH_2$ equivalent in the mixture of melamine and thiourea.

2. A process for the production of stable solutions of hardenable condensation products of melamine, thiourea and formaldehyde, and which solutions have a solids content of 40–65 percent, which comprises heating melamine and thiourea in a molecular ratio of about 1:01 with formaldehyde in aqueous alkaline solution at a pH value of about 9.4, which solution has a solids content below 40 percent, concentrating said solution by distillation to give a solids content of 40–65 percent, then heating the concentrated solution at a temperature within the range of 60–100° C. until a test portion of the resin solution, when diluted with water at 20° C. to a solids content of 35 percent, produces slight turbidity, and then cooling the resin solution to room temperature and adjusting to a pH value of about 9.4, the formaldehyde in said process being used in a proportion such that 0.5 to 1.0 molecular proportion thereof is present for each —$NH_2$ equivalent in the mixture of melamine and thiourea.

3. A process for the production of stable solutions of hardenable condensation products of melamine, thiourea and formaldehyde, and which solutions have a solids content of 40–65 percent, which comprises by heating melamine and thiourea in a molecular ratio within the range of 1:0.05 to 1:0.5 with formaldehyde in an aqueous alkaline medium at a pH value within the range of 7.0 to 10.0 and at a temperature not substantially exceeding 100° C. until a test portion of the resin solution, when diluted with water at 20° C. to a solids content of 30–40 percent, produces slight turbidity, and then cooling the resin solution to room temperature and adjusting to a pH value of 8.5 to 10.0, the formaldehyde in said process being used in a proportion such that 0.5 to 1.0 molecular proportion thereof are present for each —$NH_2$ equivalent in the mixture of melamine and thiourea.

4. A process as claimed in claim 3, wherein at least towards the end of the heating of the solution at a temperature not substantially exceeding 100° C. there is added to the solution a saturated aliphatic alcohol miscible with water.

5. A process as claimed in claim 3, wherein at least towards the end of the heating of the solution at a temperature not substantially exceeding 100° C. there is added to the solution a saturated aliphatic alcohol miscible with water and selected from the group consisting of methanol, ethanol, glycerine and hexane-triol.

6. A process for the production of stable solutions of hardenable condensation products of melamine, thiourea and formaldehyde, and which solutions have a solids content of 40–65 percent, which comprises heating melamine and thiourea in a molecular ratio of about 1:0.1 with formaldehyde in an aqueous alkaline medium at a pH value of about 9.4 and at a temperature within the range of 60–100° C. until a test portion of the resin solution, when diluted with water at 20° C. to a solids content of 35 percent, produces slight turbidity, and then cooling the resin solution to room temperature and adjusting to a pH value of about 9.4, the formaldehyde in said process being used in a proportion such that about 0.7 molecular proportion thereof are present for each —$NH_2$ equivalent in the mixture of melamine and thiourea.

7. A process as claimed in claim 6, wherein at least towards the end of the heating of the solution at a temperature not substantially exceeding 100° C. there is added to the solution a saturated aliphatic alcohol miscible with water.

8. A process as claimed in claim 6, wherein at least towards the end of the heating of the solution at a temperature not substantially exceeding 100° C. there is added to the solution a saturated aliphatic alcohol miscible with water and selected from the group consisting of methanol, ethanol, glycerine and hexane-triol.

9. A stable aqueous solution of a hardenable condensation product of melamine, triourea and formaldehyde, which solution has a solids content of 40–65 percent by weight, a pH value of 8.5 to 10.0 and which shows slight turbidity when diluted with water at 20° C. to a solids content of 30 to 40 percent by weight, the molecular ratio of melamine to thiourea in said condensation product being within the range of 1:0.05 to 1:0.5 and the molecular proportion of formaldehyde in said condensation product being 0.5 to 1.0 for each —$NH_2$ equivalent of the mixture of melamine and thiourea.

10. A stable aqueous solution of a hardenable condensation product of melamine, thiourea and formaldehyde, which solution has a solids content of 40–65 percent by weight, a pH value of 8.5 to 10.0 and which shows slight turbidity when diluted with water at 20° C. to a solids content of 30 to 40 percent by weight, the molecular ratio of melamine to thiourea in said condensation product being within the range of 1:0.05 to 1:0.5 and the molecular proportion of formaldehyde in said condensation product being about 0.7 for each —$NH_2$ equivalent of the mixture of melamine and thiourea.

11. A stable aqueous solution of a hardenable condensation product of melamine, thiourea and formaldehyde, which solution has a solids content of 40–65 percent by weight, a pH value of about 9.4 and which shows slight turbidity when diluted with water at 20° C. to a solids content of 35 percent by weight, the molecular ratio of melamine to thiourea in said condensation product being of about 1:0.1 and the molecular proportion of formaldehyde in said condensation product being 0.5 to 1.0 for each —$NH_2$ equivalent of the mixture of melamine and thiourea.

12. A stable aqueous solution of a hardenable condensation product of melamine, thiourea and formaldehyde, which solution has a solids content of 40–65 percent by weight, a pH value of about 9.4 and which shows slight turbidity when diluted with water at 20° C. to a solids content of 35 percent by weight, the molecular ratio of melamine to thiourea in said condensation product being of about 1:0.1 and the molecular proportion of formaldehyde in said condensation product being about 0.7 for each —$NH_2$ equivalent of the mixture of melamine and thiourea.

References Cited in the file of this patent
UNITED STATES PATENTS
2,327,771    D'Alelio _____ Aug. 24, 1943

UNITED STATES PATENT OFFICE
CERTIFICATE OF CORRECTION

Patent No. 2,839,484                                June 17, 1958

Alfred Renner

It is hereby certified that error appears in the printed specification of the above numbered patent requiring correction and that the said Letters Patent should read as corrected below.

Column 4, line 13, for "radio" read -- ratio --; line 33, for "1:01" read -- 1:0.1 --; line 50, after "comprises", strike out "by"; column 5, line 27, for "triourea" read -- thiourea --.

Signed and sealed this 9th day of December 1958.

(SEAL)
Attest:

KARL H. AXLINE                                ROBERT C. WATSON
Attesting Officer                             Commissioner of Patents